H. R. A. KING.
GUANO DISTRIBUTER.
APPLICATION FILED JULY 18, 1913.
1,077,838.
Patented Nov. 4, 1913.
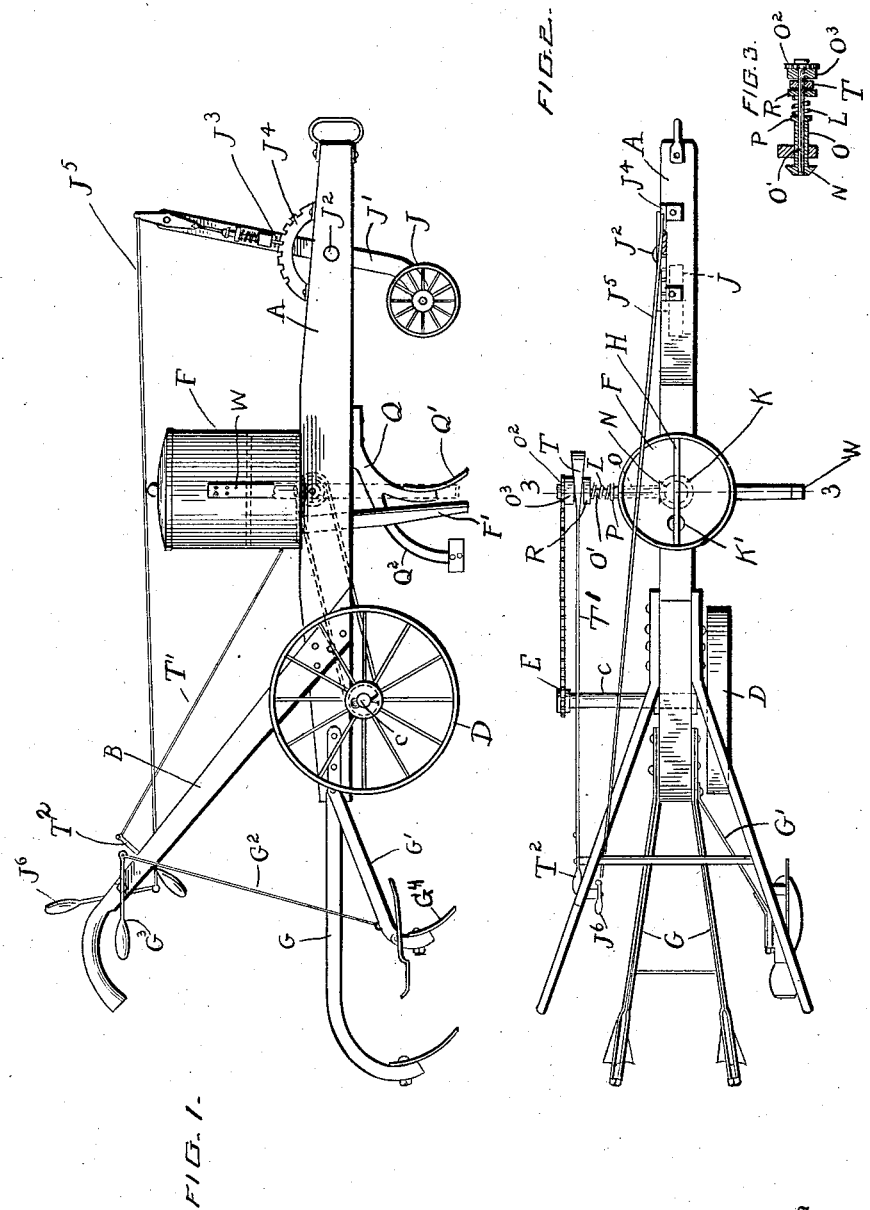

UNITED STATES PATENT OFFICE.

HIRAM R. A. KING, OF SANDY SPRINGS, SOUTH CAROLINA.

GUANO-DISTRIBUTER.

1,077,838.   Specification of Letters Patent.   Patented Nov. 4, 1913.

Application filed July 18, 1913. Serial No. 779,800.

*To all whom it may concern:*

Be it known that I, HIRAM R. A. KING, a citizen of the United States, residing at Sandy Springs, in the county of Anderson and State of South Carolina, have invented certain new and useful Improvements in Guano-Distributers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in guano distributers and comprises a simple and efficient device of this nature having various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of my invention. Fig. 2 is a top plan view, and Fig. 3 is a sectional view on line 3—3 of Fig. 2.

Reference now being had to the details of the drawings by letter, A designates the beam of the apparatus having handles B with an axle C upon which the wheel D is mounted. Said axle has a sprocket wheel E fixed thereto and which rotates with the wheel. A rotatable guano distributer F is mounted upon said beam and has a gear wheel K fixed to its lower end and an exit opening K′ in its bottom. A horizontally disposed strip H is mounted within said guano distributer and is adapted to break up the guano as the receptacle rotates. Said gear K is adapted to mesh with a beveled gear N which is fixed to a hollow shaft O splined to a shaft O′ and which latter has fixed thereto a sprocket wheel O² with a collar O³ fixed thereto.

Fixed cultivator beams G are fastened to the rear end of the beam and a pivotal beam G′, having a foot push member G⁴ fixed thereto and raised and lowered through the medium of a rod G² which is pivoted to a hand lever G³ upon one of the handles, said beam G′ having a bracket member Q is fastened to the under surface of the beam and has a furrow forming shovel Q′ fixed thereto and a scraper Q² is fastened to a projecting arm of said bracket member. A caster wheel J is mounted upon a pivotal bar J′ which in turn is journaled upon the pin J² and a pawl J³ is adapted to engage the teeth of the segment member J⁴, said pawl being operated through the medium of the rod J⁵ pivotally connected to a lever J⁶ upon the handle.

A collar P is fastened to the hollow shaft O and between which collar and a collar R, which is fastened to the shaft O′, a coiled spring L bears which normally holds the shaft O in such a position that the beveled gear N will be out of mesh with the beveled gear wheel K.

A wedge-shaped member T is mounted between the collars O and R and has a rod T′ projecting therefrom which is fastened to one end of the lever T², which latter is pivotally mounted upon one of the beams and affords means whereby the gear wheel N may be thrown into or out of operative connection with the gear wheel K.

In operation, it will be understood that the hopper normally will be at rest by reason of the gear wheels N and K being out of mesh with each other. When it is desired to cause the hopper to rotate, the operator by actuating the lever T² may cause the wedge-shaped member to be drawn rearward and, as the same impinges against the collar R, the shaft O will be moved longitudinally and the gear wheel N intermesh with the wheel K, thus causing the hopper to rotate.

Through the medium of the lever J⁶, the caster wheel may be adjusted to be positioned at different locations while the beam G′ may be actuated through the medium of the lever G³ to adjust said beam. A supporting member W is fixed to the beam A and serves as a means for supporting the guano distributer when not in use and at rest.

What I claim to be new is:—

1. A guano distributer comprising a beam, an axle journaled therein, a wheel fixed to the axle, a rotatable guano receptacle upon the beam, a gear wheel fixed to said receptacle, horizontally disposed splined shafts, telescoping one within the other, a gear wheel fixed to one of said splined shafts and adapted to intermesh with the gear wheel upon said receptacle, driving connections between the axle and splined shafts, and means for moving longitudinally one of said splined shafts to throw the gear wheel thereon in mesh with the wheel upon said receptacle, as set forth.

2. A guano distributer comprising a beam, an axle journaled therein, a wheel fixed to the axle, a rotatable guano receptacle upon the beam, a gear wheel fixed to said receptacle, horizontally disposed splined shafts, telescoping one within the other, a gear wheel fixed to one of said splined shafts and adapted to intermesh with the gear wheel upon said receptacle, driving connections between the axle and splined shafts, a wedge-shaped member adapted to actuate one of said splined shafts longitudinally to throw the gear wheel thereon in mesh with the gear wheel upon the receptacle, and a spring for returning the wedge-actuated shaft to its normal position, as set forth.

3. A guano distributer comprising a beam, an axle and a wheel rotating therewith, a guano receptacle upon the beam, a shaft journaled in said receptacle, a gear wheel upon said shaft, a hollow and a solid shaft telescoping each other and having splined connections, a sprocket wheel fixed to said solid shaft, connections between the same and axle for driving said sprocket wheel, a collar loosely mounted upon said solid shaft, a collar fixed to the hollow shaft, a spring interposed between said collars, a gear wheel fixed to the hollow shaft and adapted to mesh with the gear wheel upon the shaft on the receptacle, a wedge-shaped member movable intermediate said movable shaft and sprocket wheel, and a rod connected to said wedge-shaped member, as set forth.

In testimony whereof I hereunto affix my signature in presence of two witnesses.

HIRAM R. A. KING.

Witnesses:
J. MACK KING,
J. S. ACKER.

Copies of this patent may be obtained for five cents each, by addressing the "Commissioner of Patents, Washington, D. C."